United States Patent
Pacifici et al.

(10) Patent No.: US 9,667,807 B2
(45) Date of Patent: May 30, 2017

(54) TECHNIQUES FOR DYNAMIC ZERO-RATED SERVER CLUSTERS

(71) Applicant: Facebook, Inc., Menlo Park, CA (US)

(72) Inventors: Filippo Pacifici, San Francisco, CA (US); Zixiao Zhang, Los Altos, CA (US); Timothy Irish Bauman, San Francisco, CA (US); Breno Pompeu Roberto, Santa Clara, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/729,258

(22) Filed: Jun. 3, 2015

(65) Prior Publication Data

US 2016/0360043 A1    Dec. 8, 2016

(51) Int. Cl.
*H04M 15/00* (2006.01)
*H04L 12/14* (2006.01)

(52) U.S. Cl.
CPC .... *H04M 15/8088* (2013.01); *H04L 12/1457* (2013.01); *H04L 12/1485* (2013.01); *H04M 15/8016* (2013.01); *H04M 15/8214* (2013.01); *H04L 12/1407* (2013.01); *H04L 12/1435* (2013.01); *H04L 12/1467* (2013.01)

(58) Field of Classification Search
CPC . H04L 12/14; H04L 41/5003; H04L 12/1485; H04L 12/1425; H04L 12/1475; H04L 41/5029; H04L 65/4084; H04L 65/80; H04L 47/263; H04L 47/37; H04L 12/5602; H04L 2012/5619; H04L 2012/5632; H04L 2012/5636; H04W 12/06; H04N 21/25435; H04N 21/44204;
(Continued)

(56) References Cited

U.S. PATENT DOCUMENTS 7,054,269 B1 * 5/2006 Luguern ............ H04L 12/5602
370/232
2010/0011052 A1    1/2010 Gharabally et al.
(Continued)

FOREIGN PATENT DOCUMENTS

EP    2871802    5/2015

OTHER PUBLICATIONS

Extended European Search Report received for European Patent Application No. 15197770.9, mailed Feb. 8, 2016, 8 pages.

(Continued)

*Primary Examiner* — Nizar Sivji

(57) ABSTRACT

Techniques for dynamic zero-rated server clusters are described. Some embodiments are particularly directed to techniques for delivering zero-rated content packages in which different client devices with different zero-rated content packages may receive their appropriate zero-rated content using a shared cluster of zero-rated servers. In one embodiment, for example, an apparatus may comprise a network access component operative to receive a user request at a network service from a client device via a data network, wherein the network service is rate-adjusted for the client device with the data network; and respond to the user request; and a rate-adjustment management component operative to access a rate-adjustment wallet for a user account for the user request; and configure the network access component to respond to the user request based on the rate-adjustment wallet. Other embodiments are described and claimed.

20 Claims, 13 Drawing Sheets

(58) Field of Classification Search
CPC ......... H04N 21/44209; H04N 21/2402; H04N 21/64322; G06Q 20/405
See application file for complete search history.

(56) References Cited

U.S. PATENT DOCUMENTS

| | | | | |
|---|---|---|---|---|
| 2011/0154477 A1* | 6/2011 | Parla | ................... | H04L 63/0272 726/15 |
| 2012/0209990 A1* | 8/2012 | Honore | ............... | H04L 12/1496 709/224 |
| 2013/0040644 A1* | 2/2013 | Lin | .................... | H04W 64/006 455/436 |
| 2015/0025976 A1* | 1/2015 | Guo | ................... | G06Q 30/0267 705/14.64 |
| 2015/0067066 A1* | 3/2015 | Radhakrishnan | ....... | H04L 51/08 709/206 |
| 2015/0135303 A1* | 5/2015 | Makavy | .............. | H04L 63/0272 726/15 |
| 2015/0222939 A1* | 8/2015 | Gallant | .................. | H04L 43/08 725/9 |

\* cited by examiner

*500*

Receive a user request at a network service from a client device via a data network, wherein the network service is rate-adjusted for the client device with the data network.
*502*

Determine a user account for the user request.
*504*

Access a rate-adjustment wallet for the user account.
*506*

Respond to the user request based on the rate-adjustment wallet.
*508*

*FIG. 5*

TECHNIQUES FOR DYNAMIC ZERO-RATED SERVER CLUSTERS

BACKGROUND

Users may perform network data access using mobile devices connected to cellular data networks. The cellular data networks may use metered data. The amount of data transferred across a cellular data network may be monitored and debited against a user allocation of data. Similarly, the amount of data transferred across a cellular data network may be monitored and the user billed a fee based on the amount. However, some cellular data access may be performed against zero-rated servers, wherein the cellular system does not meter access to the zero-rated servers: the user allocation is not debited and no amount-based fee is generated for the traffic exchanged with the zero-rated servers.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for dynamic zero-rated server clusters. Some embodiments are particularly directed to techniques for delivering zero-rated content packages in which different client devices with different zero-rated content packages may receive their appropriate zero-rated content using a shared cluster of zero-rated servers. In one embodiment, for example, an apparatus may comprise a network access component operative to receive a user request at a network service from a client device via a data network, wherein the network service is rate-adjusted for the client device with the data network; and respond to the user request; and a rate-adjustment management component operative to access a rate-adjustment wallet for a user account for the user request; and configure the network access component to respond to the user request based on the rate-adjustment wallet. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

DETAILED DESCRIPTION

Figure 1:
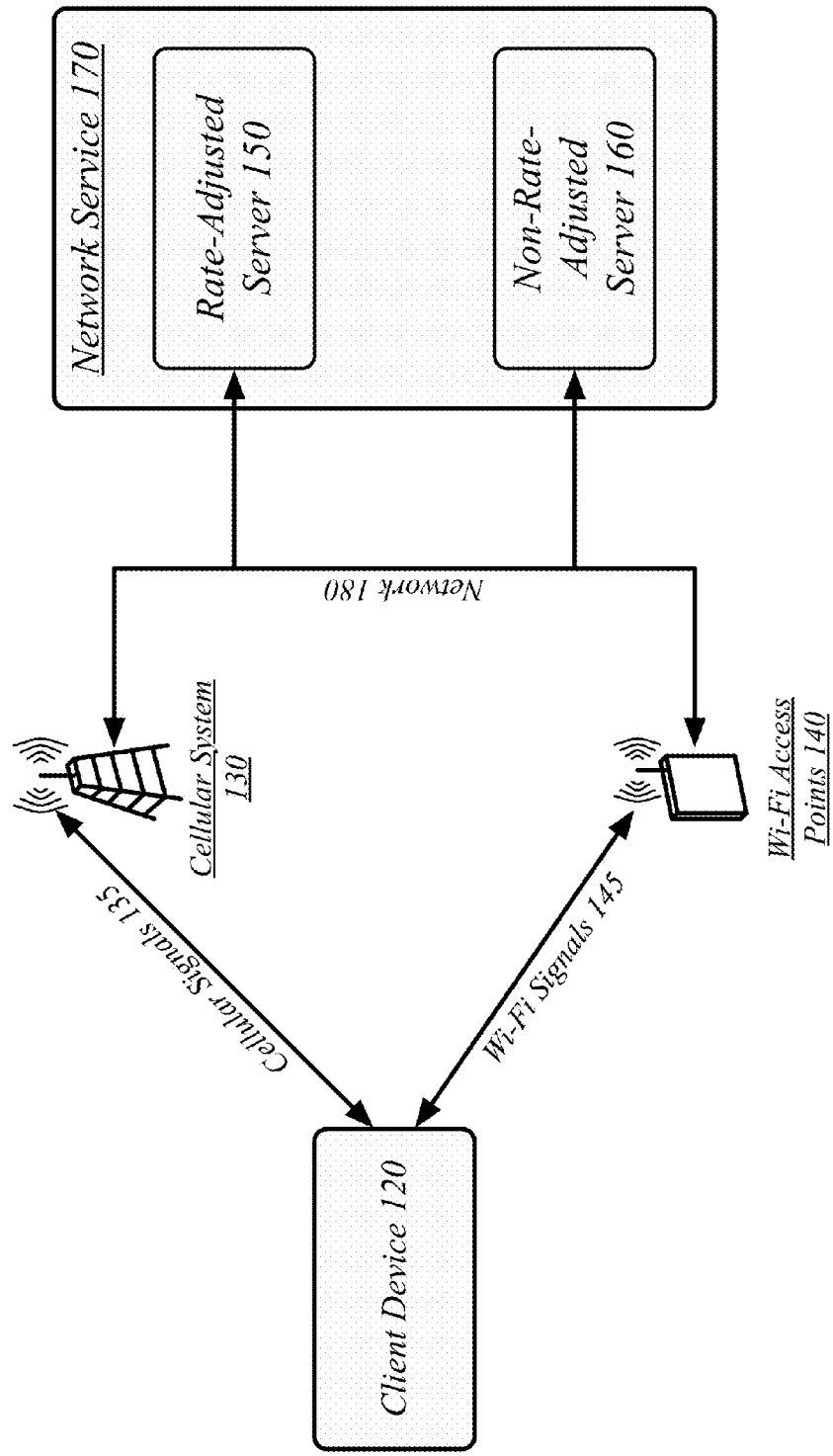
FIG. 1 illustrates an embodiment of a dynamic zero-rating system.

People may access Internet services using mobile devices that primarily operate using wireless data networks such as Wi-Fi and cellular data. This may be particularly true in markets in which low-cost Internet access is of particular importance: mobile computer devices may be cheaper than emplaced computer devices (e.g., desktop computers) or portable computer devices (e.g., laptop computers), and wireless data networks may reach area in which wired personal data access has limited, no, or only prohibitively expensive availability.

Wi-Fi networks may be provided with unlimited or pseudo-unlimited (e.g., a usage cap primarily intended to prevent abuse of the service, rather than to directly monetize normal use of the service) data policies. Cellular data networks may, however, be associated with fees related to the usage of cellular data bandwidth. Under a subscription model a user may receive a recurring cellular data bandwidth allocation that refreshes to a preset amount each cycle, such as once a month. Use above this bandwidth allocation may in some cases be prohibited and in other cases result in additional fees to the user. Under a prepaid model a user may purchase a quantity of cellular data bandwidth against which their cellular data usage is debited. Use beyond this pre-purchased allocation of cellular data bandwidth may be prohibited without the purchase of an additional quantity of cellular data bandwidth. Other models of cellular data allocation may also be supported by the embodiments herein. Similarly, it will be appreciated that the techniques for dynamic zero-rated cluster servers may be applied to any network, whether wired or wireless.

While most cellular data access may be metered, a cellular data user, cellular data network provider, and network service operator may all benefit from rate-adjusting certain data usages. Some network services may be rate-adjusted, such as being zero-rated, to reduce or standardize the cost of accessing the network service. Where a data network provider or network service operator bears the cost of accessing a network service using a data network, use of the network service may be promoted to users by reducing their cost for accessing the network service. For example, in order to promote their service and to receive the benefits of having their service being used (e.g., the network effect of user base expansion, data gathering, advertisement delivery, secondary sales), a network service operator may induce, such as through direct payment or through the promotion of the data network provider by the network service operator, a data network provider to rate-adjust access to the network service by reducing or eliminating (i.e., zero-rating) the cost to users in accessing the network service. Rate-adjustment may involve reducing or removing the debiting of a user's subscribed or pre-purchased data allocation when used to access the network service.

Alternatively or additionally, a user may purchase or otherwise arrange for the reception of rate-adjusted access to a network service, such as by purchasing a network-service-specific data package that allows unlimited (or pseudo-unlimited) access to the network service for a set fee. This may empower the user to better budget their access to the network service by informing the user of the total amount they will be billed for access to the network service for a particular time period, rather than making them dependent on a possibly-difficult guess as to the amount of their bandwidth allocation that access to a network service would use. A data network provider or networks service operator may be in a superior position to evaluate a fair price for access to a network service across a data network, due to their familiarity with the network service and its data usage, than a user, particular a new user, of the service. It will be appreciated, however, that the enclosed techniques may be used in coordination with any business or commercial motivation for providing selective rate-adjusted network access.

Rate-adjusted access—of which zero-rated access is a particular type—to a network service may come with limitations on the access to that service that receives the benefit of rate-adjustment. For example, a service which includes image content may be associated with a restriction on how many images, or how many images of a particularly high quality, may be downloaded using rate-adjusted access. Any additional images beyond that quantity, or high-quality images beyond that quantity, may instead only be authorized for access using the user's general data network access and as such be debited against their data allocation. In another example, a service which includes video content may be flatly restricted from providing that video content using that rate-adjusted access. In general, rate-adjusted access may be associated with rate-adjustment policies defining limitations, restrictions, allocations, and other policy elements that define what interactions between a device and a network service across a data network may receive the benefit of rate-adjustment and what may not.

In some situations, a rate-adjustment policy may be universally applied to all users of a particular network service. In some situations, a single rate-adjustment policy may exist for a particular network service with a user's device either receiving the benefit of the rate-adjustment policy—such as due to purchasing a rate-adjustment access package with the data network provider—or not receiving any rate-adjusted access to the network service. However, users, data network providers, and network service operators may benefit from the creation and implementation of more fine-tuned rate-adjustment policies. Different users of a particular network service, each of them using the same data network provider, may be assigned different rate-adjustment policies based on the purchase of different rate-adjustment plans or other distinguishing factors.

A data network may distinguish between rate-adjusted traffic and non-rate-adjusted traffic based on the network addresses (e.g., Internet Protocol (IP) addresses) to which network traffic is directed. A data network provider may maintain a registry of rate-adjusted network addresses where data transfer with those rate-adjusted network addresses is not debited against a user's data allocation or otherwise charged to the user, or is debited against or charged at a lower rate for rate-adjustment that does not result in unmetered access. The enforcement of rate-adjustment policies may be implemented through controlling access to the services provided by rate-adjusted servers, where a rate-adjusted server is a network server assigned a network address that is rate-adjusted with a particular data network provider.

A rate-adjusted server may therefore enforce rate-adjustment policies by tailoring its response to user requests based on the specific rate-adjustment allowances for each user. Where a user is authorized to receive unlimited rate-adjusted access to a network service, the rate-adjusted server may provide unrestricted service to the user's device. Where a user is not authorized to receive any rate-adjusted access to a network service, the rate-adjusted server may reject any attempt by the user to access the network service via the rate-adjusted server, such as by redirecting the user's device to a non-rate-adjusted server for the network service. Where a user is authorized to receive a specified configuration of rate-adjusted service, the rate-adjusted server may provide access to the network service according to that specified configuration.

A user's particular configuration of rate-adjusted service may be defined by a rate-adjustment wallet for the user. A rate-adjustment wallet may specify that a user is to receive unrestricted rate-adjusted access, no rate-adjusted access, or rate-adjusted access with particular limitations, additions, or other specifications. By using a rate-adjusted wallet, the network service may empower a particular data network provider to sell different rate-adjustment packages by simply providing the details of each purchased package to the network service and relying on the network service to implement the specifications of the rate-adjustment packages, with all rate-adjusted traffic—even for different users with different rate-adjustment packages—going to a common pool of rate-adjusted servers with differences in rate-adjustment authorizations being enforced on a per-user basis by the rate-adjusted servers. Further, multiple data network providers may share a common cluster of rate-adjusted servers, with the rate-adjustment wallets for the users defining the rate-adjustment allowances for each user in relation to the data network being used by each users' devices.

The use of rate-adjustment wallets may therefore simplify the network configuration of a network service in providing rate-adjusted service to users of the network service. Rather than a pool of network servers being configured for each data network provider and further for each rate-adjustment package offered by each data network provider, a shared cluster of rate-adjusted servers may be used for multiple data network providers and/or multiple rate-adjustment packages for the data network providers. Similarly, a data network provider may introduce new or remove existing rate-adjustment packages without reconfiguring what network addresses they rate-adjust. Users may benefit from having the option to receive more customized rate-adjustment packages and more network services offering rate-adjustment because of this reduced work in providing rate-adjusted access to a network service. As a result, the embodiments can improve the affordability, modularity, and configurability of providing rate-adjusted data service for a user, data network provider, and network service operator.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a dynamic zero-rating system 100. In one embodiment, the dynamic zero-rating system 100 may comprise a computer-implemented system having software applications comprising one or more components. Although the dynamic zero-rating system 100 shown in FIG. 1 has a limited number of elements in a certain topology, it may be appreciated that the dynamic zero-rating system 100 may include more or less elements in alternate topologies as desired for a given implementation.

A client device 120 may perform various operation using network data accessed over a network. The client device 120 may access a cellular system 130 using cellular signals 135. The cellular system 130 may be a cellular network including data access, the cellular system 130 provided by a cellular provider with which the user of the client device 120 has a service contract, the service contract for cellular data server to the client device 120. The cellular system 130 may be a metered network, in which data access is priced, at least in part, according to an amount of data transferred over the network. The cellular data service contract may be a pre-paid contract in that a cellular data allocation is purchased prior to use providing a specific allocation, with general cellular data access (e.g., cellular data access to a non-zero-rated address) cut off once the cellular data allocation is exhausted. The cellular data service contract may be a subscription contract providing longer-term cellular data access. A subscription contract may include a cellular data allocation, but may also allow for cellular data use beyond the exhaustion of the cellular data allocation, with any further use generating additional fees. For example, a cellular data subscription may include 1 GB of cellular data per month, with access to zero-rated resources not debited against the allocation, with an additional charge for each full or partial additional gigabyte of cellular data used each month.

The client device 120 may access one or more Wi-Fi access points 140 using Wi-Fi signals 145. Wi-Fi access points 140 may be provided by a plurality of different operators. Some of the Wi-Fi access points 140 may be personal in nature, such as a home Wi-Fi network operated by the user of client device 120 based on a domestic Internet connection. Some of the Wi-Fi access points 140 may be free of charge or provided as a complimentary portion of a service, such as free Wi-Fi service in coffee shops, hotels, and other public accommodations. Some of the Wi-Fi access points 140 may require payment for use. However, the Wi-Fi access points 140 may be generally non-metered networks, in which, whether or not access is free or paid, there are no fees for use of the Wi-Fi access points 140 generated based on an amount of data transferred over the networks.

The client device 120 may be operative to access network resources hosted on servers 150, 160. A network resource may comprise any network-accessible resource. A network resource may be retrieved by the client device 120, such as in the reception of a video download, video stream, music download, web page view, or any other reception of data across a network. A network resource may be transmitted to the servers 150, 160, such as the uploading of an image, video, audio file, text message, or any other transmission of data across a network. Accessing a network resource may include both transmitting and receiving data, such as the transmission of a request and the reception of a response, the submission of data and the reception of responding data, or any other two-way exchange of data across a network. The client device 120 may, in various circumstances, use either of a cellular system 130 or Wi-Fi access points 140 to access network resources on the servers 150, 160.

Some cellular access may be "rate adjusted" or "zero rated." Zero-rated cellular access may not count against a cellular data communication allowance that may be included in a cellular customer's plan or pre-paid purchase. Rate-adjusted cellular access may count against the cellular data communication allowance at a lower rate than non-rate-adjusted cellular access, with zero-rated cellular access therefore constituting a particular case of rate-adjusted cellular access. Zero-rated cellular access may not generate a fee to the cellular customer, even if that customer is over a limited quantity of allocated or pre-paid cellular data access, or where such an allocated or pre-paid cellular data access does not exist. Rate-adjusted cellular access may be dependent on the specific network accessed, with the cellular carrier having a list of one or more network addresses—such as internet protocol (IP) addresses—to which cellular customers have zero-rated access. This list may vary between cellular carriers.

The network 180 may comprise any system or mechanism for the transmission of computer data using computer-transmitted and computer-received transmissions. The network 180 may correspond to at least a portion of the Internet. The network service 170 may comprise any type of service accessible via a computer network 180. The network service 170 may comprise a service hosting Internet-accessible resources. The network service 170 may comprise a social-networking service, providing access to the retrieval and submission of social-networking resources. The network 170 may comprise both rate-adjusted servers and non-rate-adjusted servers. The network 170 may comprise one or more clusters of rate-adjusted servers. A cluster of rate-adjusted servers may be associated with rate-adjustment for one or more data network providers, such as one or more data network providers in a particular geographic region. The non-rate-adjusted server 160 may not be zero-rated with the cellular system 130. As such, any direct access to the non-rate-adjusted server 160 that uses cellular system 130 may result in data allocation usage at the normal rate. The rate-adjusted server 150 may be rate-adjusted with the cellular system 130. The client device 120 may therefore be benefited by, where authorized, using rate-adjusted server 150 to access the network service 170.

The description of rate-adjusted server 150 as being a "rate-adjusted server" may correspond to the rate-adjusted server 150 being assigned to provide rate-adjusted access to the network service 170 for the users of one or more data networks, such as cellular system 130. It will be appreciated that rate-adjusted server 150 may therefore not be rate-adjusted or zero-rated with all cellular providers as cellular providers other than that of cellular system 130 may be assigned different rate-adjusted servers than rate-adjusted server 150 or may not have entered into a rate-adjustment agreement with the network service 170. Rate-adjusted server 150 therefore exists with an association to the one or more data networks with which it is rate-adjusted.

The dynamic zero-rating system 100 may use knowledge generated from interactions in between users. For example, the dynamic zero-rating system 100 may comprise a component of a social-networking service and may use knowledge generated from the broader interactions of the social-networking service. As such, to protect the privacy of the users of the dynamic zero-rating system 100 and the larger social-networking service, dynamic zero-rating system 100 may include an authorization server (or other suitable component(s)) that allows users to opt in to or opt out of having their actions logged by the dynamic zero-rating system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the dynamic zero-rating system 100 and other elements of a social-networking service through blocking, data hashing, anonymization, or other suitable techniques as appropriate. For example, while interactions between a social-networking service and the users of the social-networking service may be used to learn media content preferences and the relationship between preferences for different pieces of media content, these interactions may be anonymized prior to or as part of the learning process.

Figure 2A:
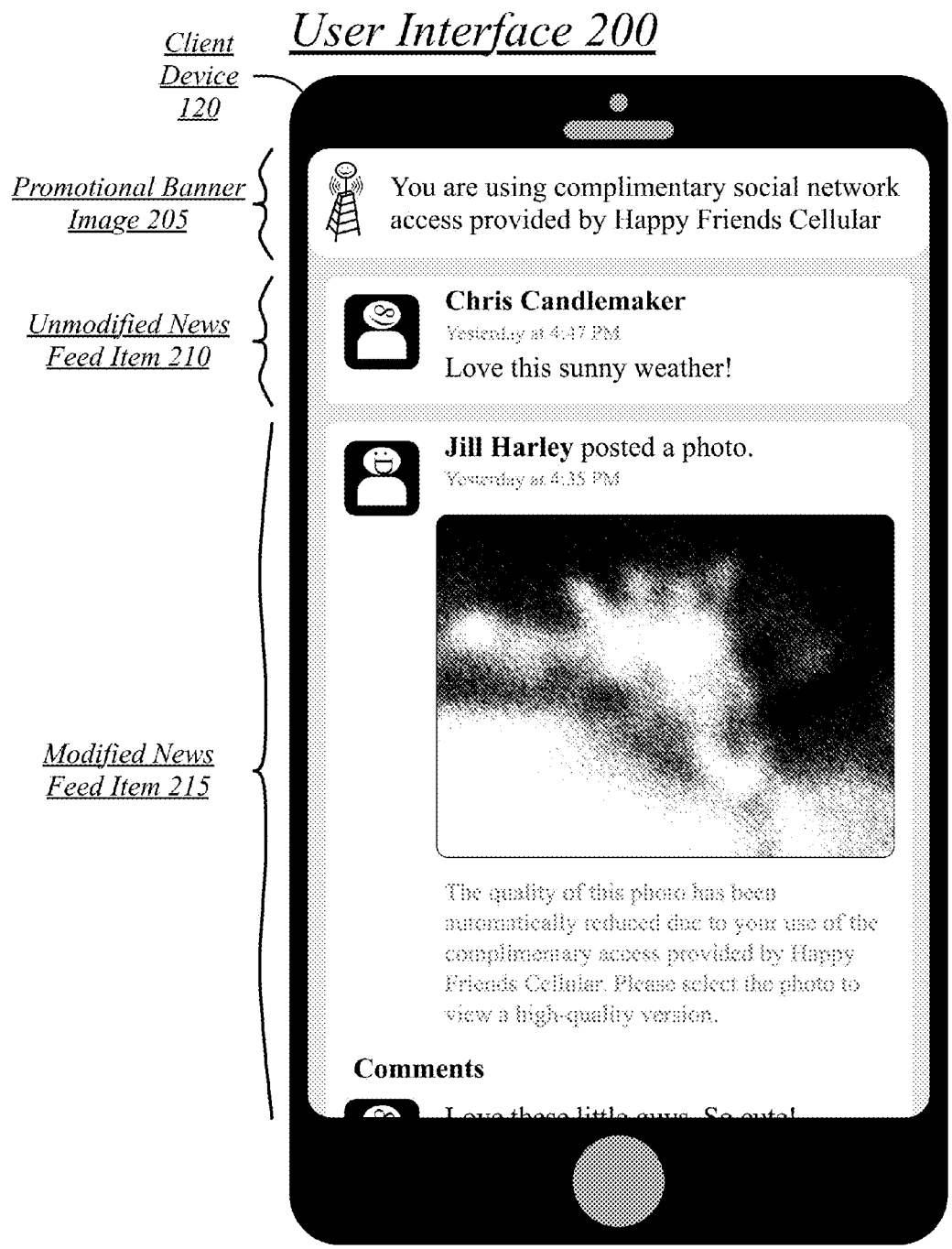
FIG. 2A illustrates an embodiment of a user interface displaying a rate-adjusted news feed.

FIG. 2A illustrates an embodiment of a user interface 200 displaying a rate-adjusted news feed. The user interface 200 may correspond to the interface for a social-networking application. However, it will be appreciated that the enclosed techniques may be used in association with other network services.

The user interface 200 may correspond to a display of information received from the network service 170. Resources received from the network service 170 may be displayed as part of the user interface 200, the resources customized or otherwise configured based on the client device 120 accessing the network service 170 at a rate-adjusted server 150 and being subject to rate-adjustment policies.

The user interface 200 may correspond to a view of a news feed for a social-networking service. A news feed may comprise a plurality of news items related to a user of the social-networking service. In general, the client device 120 may receive one or more items from a network service 170 comprising one or more items that were not modified or otherwise configured based on rate-adjustment policies and/or comprising one or more items that were modified or otherwise configured based on rate-adjustment policies.

For example, the user interface 200 includes a promotional banner image 205. The promotional banner image 205 advertises that the reception of the displayed items was performed using rate-adjusted access provided by a particular data network provider. While the illustrated promotional banner image 205 refers to the access as being "complimentary," it will be appreciated that banners and other visual elements may be used where rate-adjusted access is provided because the user purchased rate-adjusted access to the network service 170. A promotional banner image 205 may correspond to an element added to a response to a user request based on rate-adjustment policies.

The user interface 200 includes an unmodified news feed item 210. As the unmodified news feed item 210 comprises a few text sequences and a small avatar image, the unmodified news feed item 210 may use sufficiently little network bandwidth to transmit that rate-adjustment policies for the user authorize the client device 120 to receive the unmodified news feed item 210 unmodified in comparison to how it would be received from a non-rate-adjusted server 160.

The user interface 200 includes a modified news feed item 215. The modified news feed item 215 may have been configured based on rate-adjustment policies for the user differently than if the user had accessed the network service 170 via the non-rate-adjusted server 160 instead of the rate-adjusted server 150. The non-rate-adjusted server 160 may provide non-rate-adjusted access to the network service 170 with any data items received from the network service 170 via the non-rate-adjusted server 160 not being configured with reference to rate-adjustment policies. In the illustrated embodiment of a user interface 200 the modified news feed item 215 contains an image element with that image element having been degraded—reduced in quality and therefore in file size—according to a rate-adjustment policy for the user. The rate-adjustment policy may specify a maximum file size, maximum resolution, or other limitation on the quality of images received via a rate-adjusted server 150. In some embodiments a modified data item may be transmitted and displayed in association with a visual element notifying the client device 120 and user of the client device 120 that the data item has been modified—or specifically that the quality of the data item has been degraded—according to a rate-adjustment policy applied due to the use of rate-adjusted access by the client device 120. In the illustrated user interface 200 the visual element comprises a text sequence, but in other embodiments it may comprise an icon, symbol, image, or any other form of indicator.

Figure 2B:
FIG. 2B illustrates an embodiment of a user interface displaying a rate-adjusted usage dialog.

FIG. 2B illustrates an embodiment of a user interface 225 displaying a rate-adjusted usage dialog 230.

The user of the client device 120 may select a degraded data item and request to view a high-quality (i.e., non-degraded) version of the data item. For example, the image displayed in the modified news feed item 215 in user interface 200 may be selected by the user to request the retrieval of the image at a higher quality than the version of the image displayed in the modified news feed item 215.

In response to a user request to retrieve a higher-quality version of a data item—or in response to any user request to retrieve a resource that is not allowed, or has only a limited allowance, to use rate-adjusted access—the client device 120 may be configured by the network service 170 to display a rate-adjusted usage dialog 230 empowering the user to manage their use of rate-adjusted and non-rate-adjusted access to the network service 170. The configuration by the network service 170 of the client device 120 may comprise, for instance, the configuration of an application (e.g., dedicated mobile application, web browser, etc.) on the client device 120 used to access the network service 170.

The rate-adjusted usage dialog 230 may inform a user of relevant rate-adjustment policies associated with their request. The rate-adjusted usage dialog 230 may empower a user to select whether they want to perform a non-rate-adjusted access to a network resource. The rate-adjusted usage dialog 230 may empower a user to selected whether they want to use some or all of an allocation of rate-adjusted access to a network resource.

In the illustrated user interface 225 the rate-adjusted usage dialog 230 includes an indicator, in this case a text segment, identifying the type of request performed by the user, in this case a request to download a high-quality version of an image. The rate-adjusted usage dialog 230 includes a notification of how performance of this request will interact with the rate-adjustment policies associated with the user: that the user may perform this request using rate-adjusted access, but that the user may only perform a limited number of rate-adjusted accesses of this type in a given time period, and further the specific number of rate-adjusted accesses of this type allowed, the number of rate-adjusted accesses of this type remaining to the user in the current time period, and the number of rate-adjusted accesses of this type that will be used in performing the request. While this particular request for a single image may use only one image-download allocation, it will be appreciated that alternative requests, such as an album download request, may use multiple allocations of an image-download allowance. It will be further appreciated that some of the illustrated elements of the rate-adjusted usage dialog 230 may be omitted in various embodiments and that additional elements may be included in various embodiments.

The rate-adjusted usage dialog 230 may include a continue control empowering the user to approve the performance of the user's request given the rate-adjustment information provided by the rate-adjusted usage dialog 230. The continue control may specifically authorize the client device 120 to perform a request that will result in a decrementing of a user allocation of rate-adjusted access to the network service 170.

The rate-adjusted usage dialog 230 may include a cancel control empowering the user to disapprove and therefore cancel the performance of the user's request given the rate-adjustment information provided by the rate-adjusted usage dialog 230. The cancel control may specifically reject authorization for the client device 120 to perform a request that will result in a decrementing of a user allocation of rate-adjusted access to the network service 170.

The rate-adjusted usage dialog 230 may include a purchase control empowering the user to purchase an additional rate-adjusted-access allocation, to purchase a rate-adjustment package that doesn't limit the user based on a rate-adjusted-access allocation, or otherwise to perform a purchase that modifies that rate-adjustment policies applied to the user when performing rate-adjusted access to the network service 170. The purchase control may be of particular importance where a user's allocation has expired for the time period, and as such in some embodiments may only be displayed where a user's allocation has expired. However, in some embodiments the purchase control may be displayed even where a user has a remaining allocation. For example, the purchase of an unlimited high-quality image package may allow the user to view higher-quality image inline in a news feed without having to manually select for the reception of higher-quality images.

Figure 2C:
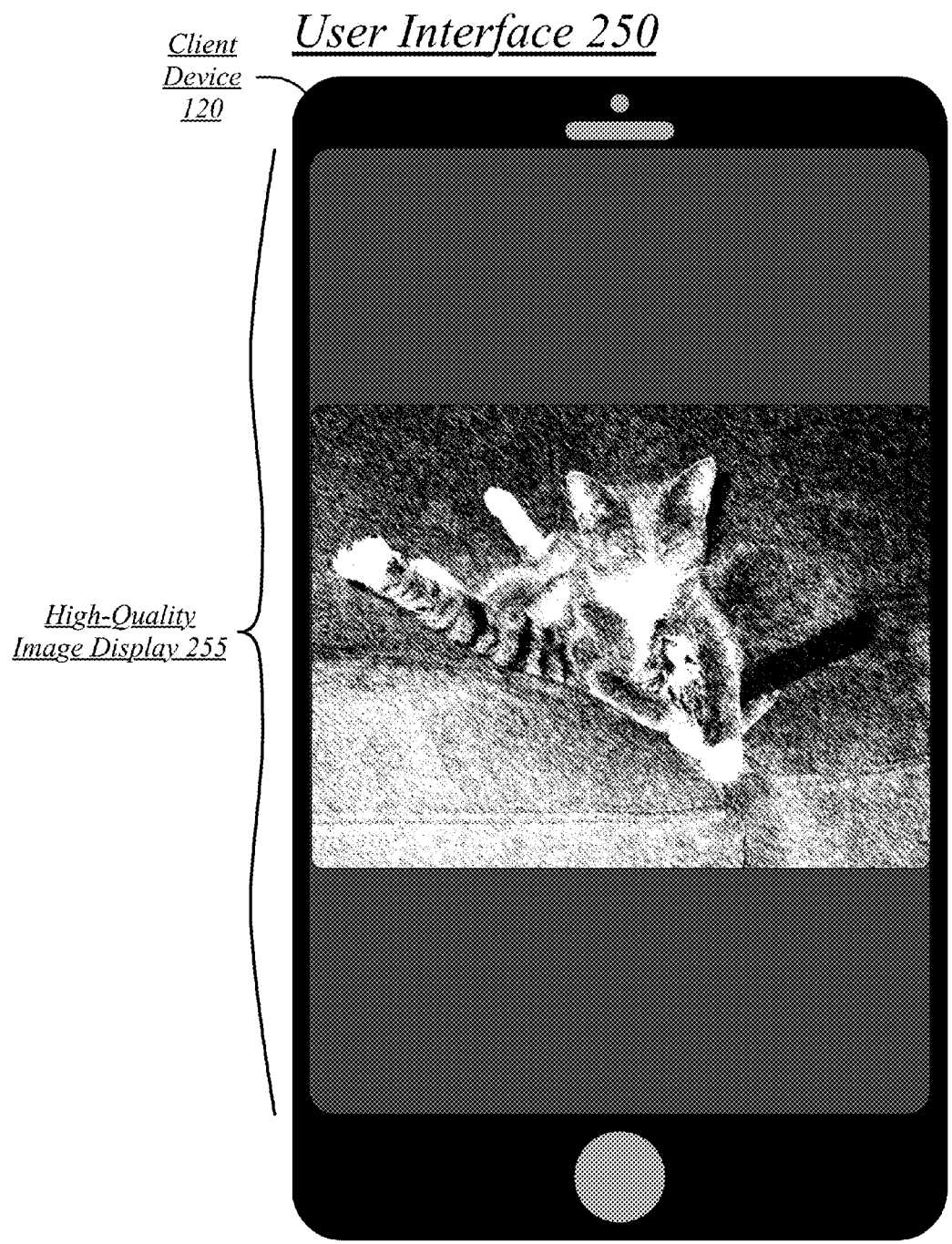
FIG. 2C illustrates an embodiment of a user interface displaying a high-quality image display.

FIG. 2C illustrates an embodiment of a user interface 250 displaying a high-quality image display 255.

The high-quality image display 255 in user interface 250 is an example display in which the high-quality image is displayed in its own user interface view. It will be appreciated that in alternate embodiments a high-quality image reached from the selection of a lower-quality image in a news feed, album, or other view may instead be displayed in that news feed, album, or other view by replacing the display of the lower-quality image with the display of the high-quality image. The high-quality image display 255 is a display of an image displayed at a second quality that was previously displayed at a first quality, wherein the second quality is a higher quality (e.g., superior image resolution, higher file size) than the first previously-displayed quality. The first quality may have been allowed in an unlimited or pseudo-unlimited amount by a rate-adjustment policy for the user while the second quality may only be allowed in a limited amount by the rate-adjustment policy.

Alternatively, a high-quality image display 255 may use a quality not allowed by the rate-adjustment policy even in limited amounts. As such, in some embodiment a high-quality image display 255 may be accessed using a non-rate-adjusted server 160 instead of a rate-adjusted server 150. Similarly, where a user's allocation of high-quality image downloads has been expended a non-rate-adjusted server 160 server may be used—possibly in reaction to receiving user permission to use non-rate-adjusted access— to access a high-quality image display 255.

Figure 2D:
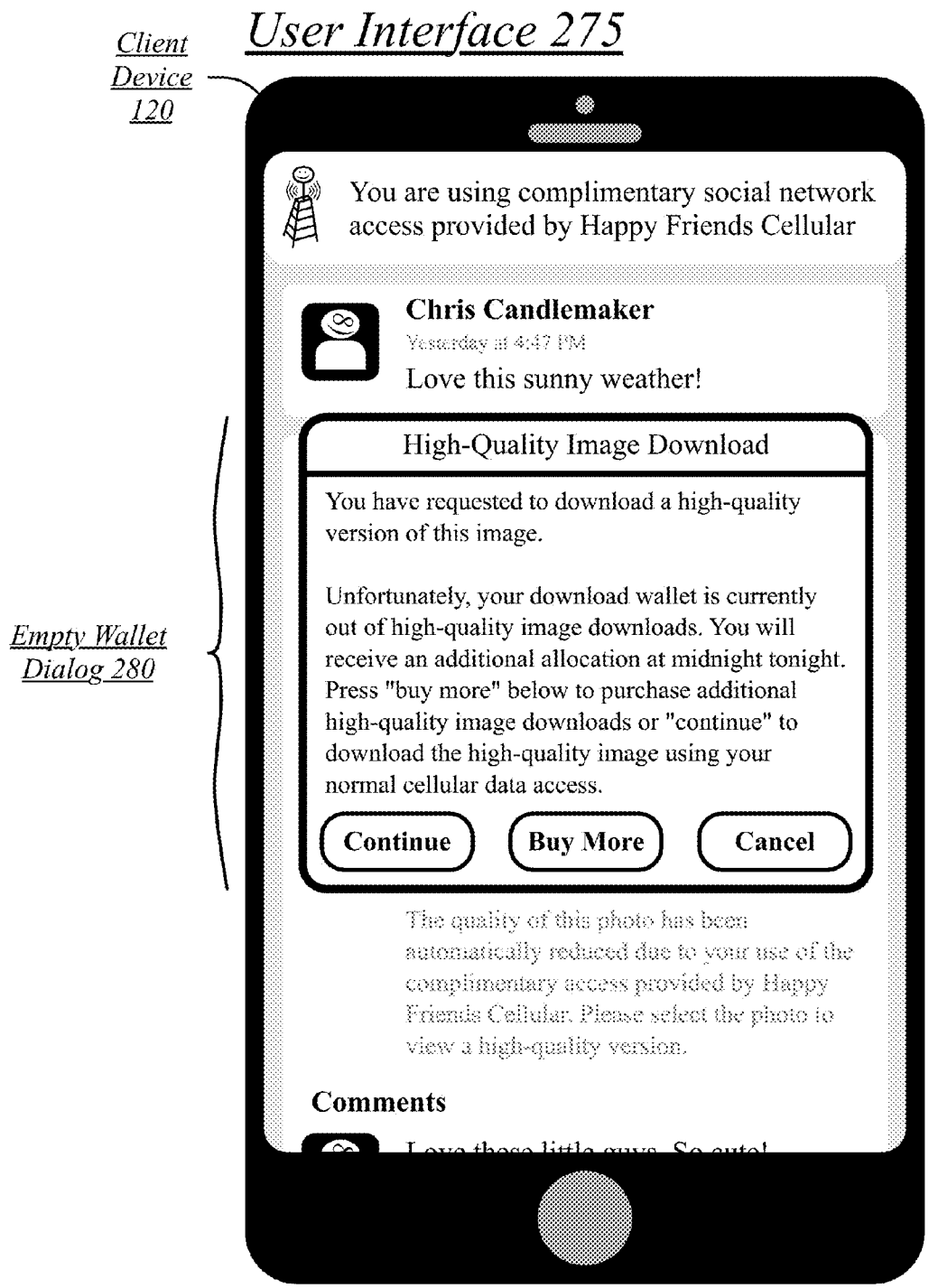
FIG. 2D illustrates an embodiment of a user interface displaying an empty wallet dialog.

FIG. 2D illustrates an embodiment of a user interface 275 displaying an empty wallet dialog 280.

An empty wallet dialog 280 may be displayed when a user performs a request that could be performed using rate-adjusted network access according to rate-adjustment policies for the user were an access allocation for the user not expended but that access allocation has been expended at the time of the request. The empty wallet dialog 280 may therefore be displayed to notify a user that their request may not be currently performed using rate-adjusted access due to the exhaustion, possibly temporary, of their allocation of rate-adjusted access, possibly an allocation of a specific type (e.g., high-quality image downloads).

An empty wallet dialog 280 may include a visual element, such as a displayed text segment, communicating the current status of the user's allocation of rate-adjusted access. This text segment may include a notification of the type of rate-adjusted access that is currently exhausted, such as high-quality image downloads. This text segment may communicate when an additional allocation will be automatically provided. This text segment may explain the associated controls.

The empty wallet dialog 280 may include a continue control empowering the user to access the requested resource using non-rate-adjusted access. The continue control, when selected, may initiate access to (e.g., download or upload of) the resource using non-rate-adjusted access to a non-rate-adjusted server 160.

The empty wallet dialog 280 may include a purchase control empowering the user to purchase an additional rate-adjusted-access allocation, to purchase a rate-adjustment package that doesn't limit the user based on a rate-adjusted-access allocation, or otherwise to perform a purchase that modifies that rate-adjustment policies applied to the user when performing rate-adjusted access to the network service 170.

The empty wallet dialog 280 may include a cancel control empowering the user to disapprove and therefore cancel the performance of the user's request given the rate-adjustment information provided by the empty wallet dialog 280. The cancel control may specifically reject authorization for the client device 120 to perform a request that will use non-rate-adjusted access to the network service 170.

Figure 3:
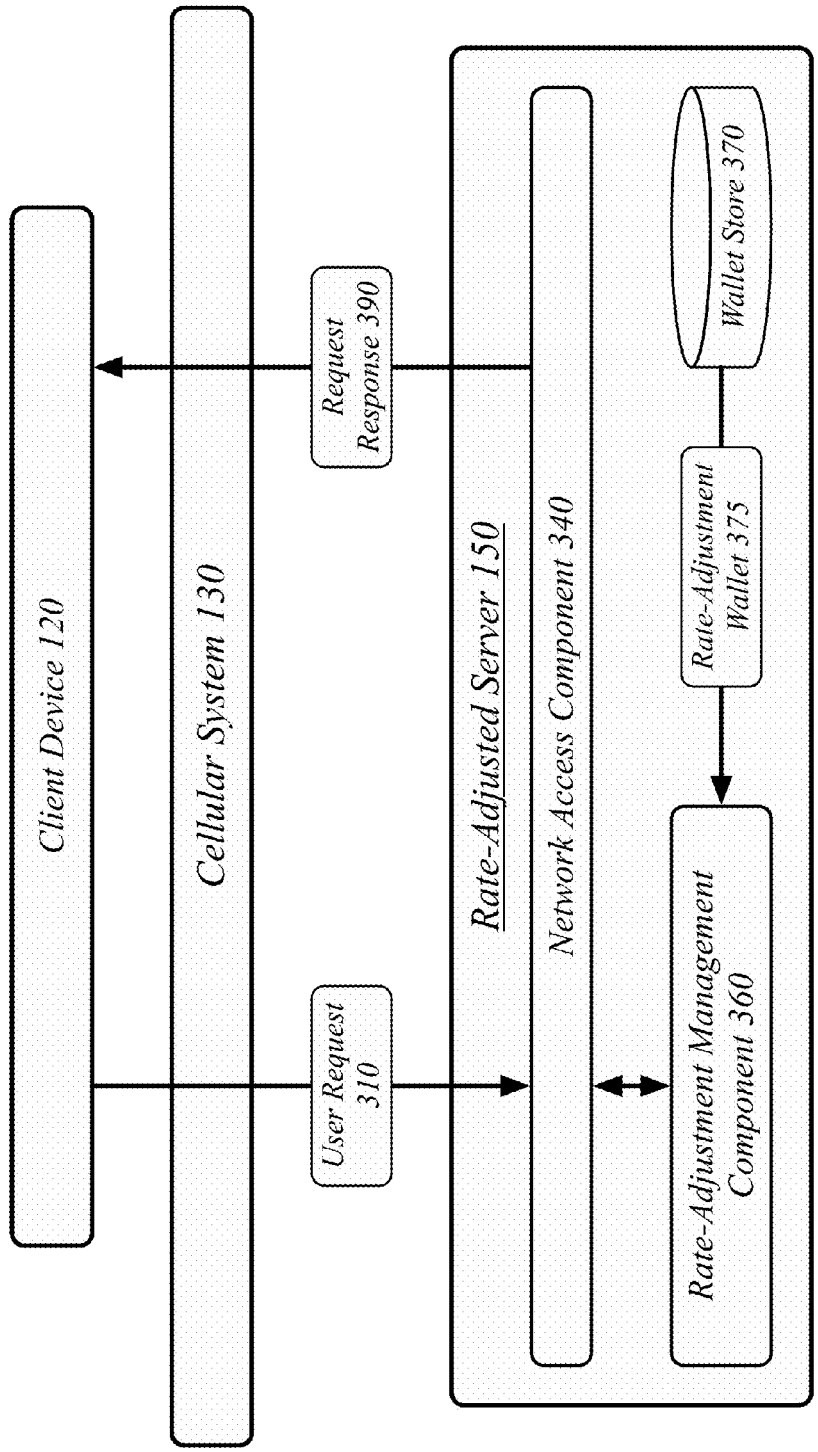
FIG. 3 illustrates an embodiment of a user request and request response interaction.

FIG. 3 illustrates an embodiment of a user request 310 and request response 390 interaction.

A client device 120 may transmit a user request 310 to a rate-adjusted server 150 using a cellular system 130. The rate-adjusted server 150 may be registered for rate-adjusting with the cellular system 130 due to an agreement between a network service 170 providing the rate-adjusted server 150 and the cellular data provider providing the cellular system 130. The agreement may specify policies that define how the rate-adjusted server 150 may provide services to client devices that are using rate-adjusted access. The rate-adjusted server 150 may generate a request response 390 according to these policies within the framework of the operations of the network service 170. For example, a messaging service would offer messaging services to the extent and in the manner allowed by the rate-adjustment policies. A social-networking service would offer social-networking services to the extent and in the manner allowed by the rate-adjustment policies. An image-hosting service would offer image-hosting services to the extent and in the manner allowed by the rate-adjustment policies. In general, any network service 170 would offer services to the extent and in the manner allowed by the rate-adjustment policies.

Where the user request 310 is allowed to be responded to normally—in the same manner as if the user request 310 were received without rate-adjusted access—the request response 390 may comprise the same response that would be generated if rate-adjusted access were not used. Where the user request 310 is allowed to be responded to normally given a limited allocation of rate-adjusted access, the request response 390 may comprise the same or a similar response that would be generated if rate-adjust access were not used, with a particular allocation of rate-adjusted access decremented in response to the performance of the request response 390. Where the user request 310 is now allowed to be responded to normally—either due to limitations on allowed responses or due to the exhaustion of a user's allocation of rate-adjusted access—the request response 390 may comprise a rejection of the request, a redirection of the request to a non-rate-adjusted server 160, or otherwise prevent the normal fulfillment of the user request 310 in response to the rate-adjustment policies applied to the user. In some cases, an otherwise-normal response may be modified according to the rate-adjustment policies, such as where the benefit of receiving rate-adjusted access is promoted to users of the rate-adjusted server 150. Similarly, an otherwise-normal response may be modified by the rate-adjusted server 150 in order to inform the user of their use of rate-adjusted access, such as where responding to the user's request used up at least a portion of a user's allocation of a type of allocation of rate-adjusted access.

The rate-adjusted server 150 may include a network access component 340. The network access component 340 may be a software module, hardware module, or combined software/hardware module. The network access component 340 may be a front-end to the rate-adjusted server 150 receiving incoming network connections from client devices across a data network, receiving user requests from the client devices, and transmitting responses to the user requests to the client devices. The network access component 340 may use a network interface controller (NIC) hardware device interfacing with the data network.

The rate-adjusted server 150 may include a rate-adjustment management component 360. The rate-adjustment management component 360 may be a software module, hardware module, or combined software/hardware module. The rate-adjustment management component 360 may retrieve the rate-adjustment policies associated with a particular client device 120 and/or user of the client device 120 and may retrieve any variable information relevant to those rate-adjustment policies such as the use of any limited rate-adjustment allocations.

The combination of the rate-adjustment policies associated with a client device 120 and the variable information relevant to those rate-adjustment policies may be combined together into a rate-adjustment wallet 375, the rate-adjustment wallet 375 combining both persistent information (e.g., policies and periodic allocations) and temporary information (e.g., time-period specific use of allocations) for a user and/or their client device 120. The rate-adjustment wallets for a plurality of users may be stored in a wallet store 370, with the rate-adjustment management component 360 retrieving the appropriate rate-adjustment wallet 375 for a particular user based on identifying information for the user and/or their client device 120. In general, a user may be associated with a particular client device 120 and a client device 120 may be associated with a particular user such that a rate-adjustment wallet—and its associated policies and variable information—may be logically associated with both a client device 120 and its user. Whether rate-adjustment allocations may follow a user between client devices or are locked to a particular client device may be defined by the agreement between a network service 170 and a data network operator. In general, however, a rate-adjustment wallet 375 will be assigned to a particular customer account with a cellular provider and therefore be assigned to one particular client device 120 at a time, but capable of being moved between client devices such as where a user purchases a new client device or moves a subscriber identity module (SIM) to a new client device.

The network access component 340 may receive a user request 310 at a network service 170 from a client device 120 via a data network. The network service 170 may be rate-adjusted for the client device 120 with the data network based on the user request 310 being received at a rate-adjusted server 150 assigned a network address that is rate-adjusted with the data network. The network service 170 being rate-adjusted for the client device 120 may comprise the network service being zero-rated for the client device 120 with the data network.

In some embodiments, the network service 170 may be rate-adjusted with a plurality of data networks including the data network via which the user request 310 is received, wherein the rate-adjustment wallet 375 for the user account is specific to the data network via which the user request 310 is received. The network access component 340 may determine a data network provider for the data network via which the user request 310 is received according to a provider header of a received network transmission of the user request 310. The provider header may include, for instance, a network address associated with the data network provider, the network address corresponding to at least an element of the cellular system 130 (e.g., a network device operating as part of the cellular system 130). The rate-adjustment management component 360 may determine the rate-adjustment wallet 375 to access based on the user account and the determined data network provider.

The network access component 340 may extract a phone number from a network header for the user request 310. The cellular system 130 may insert an identifier for a client device 120 into a network header for the user request 310, the identifier comprising a phone number in some embodiments. The rate-adjusted server 150 may determine a user identifier for a user of the client device 120 based on the identifier extracted from the network header, as may be performed by either of the network access component 340 or rate-adjustment management component 360. The user identifier may identify a user account with the network service 170 for the user of the client device 120 and thereby be used to determine a user account for the user request 310. The rate-adjustment management component 360 may access a rate-adjustment wallet for the user account by retrieving the rate-adjustment wallet from a wallet store 370. The rate-adjustment wallet may be defined according to a data access product associated with a data network provider for the data network, the data access product purchased by the user of the client device 120 for use with the client device 120—such as in association with a phone number and/or SIM card for the client device 120—for rate-adjusted access to one or more services including the network service 170 comprising the rate-adjusted server 150.

The network access component 340 may respond to the user request 310 based on the rate-adjustment wallet by transmitting to the client device 120 a request response 390 generated according to rate-adjustment policies and/or rate-adjustment allocations stored in the rate-adjustment wallet 375. The rate-adjustment management component 360 may configure the network access component 340 to respond to the user request based on the rate-adjustment wallet 375 by defining what modifications to the normal response process should be applied based on the rate-adjustment policies and allocations stored in the rate-adjustment wallet 375.

The rate-adjustment management component 360 may determine based on a rate-adjustment allocation stored in the rate-adjustment wallet 375 whether the user account is authorized to perform the user request 310 using rate-adjusted access to the network service 170. The rate-adjustment management component 360 may determine based on a rate-adjustment allocation stored in the rate-adjustment wallet 375 that the user account is authorized to perform the user request 310 using rate-adjusted access to the network service 170 and configure the network access component 340 to perform the user request 310 in response to determining that the user account is authorized to perform the user request 310 using rate-adjusted access to the network service 170. Alternatively, the rate-adjustment management component 360 may determine based on a rate-adjustment allocation stored in the rate-adjustment wallet 375 that the user account is not authorized to perform the user request 310 using rate-adjusted access to the network service 170 and configure the network access component 340 to transmit a user request rejection to the client device 120 in response to determining that the user account is not authorized to perform the user request 310 using rate-adjusted access to the network service 170, the user request rejection comprising the request response 390.

The user request 310 may comprise at least a data access request to a network resource. The data access request may correspond to a data access request type, the data access request type corresponding to a type (e.g., an image media type, a video media type, an audio media type) of the network resource being requested. The rate-adjustment wallet 375 may define a data access allocation for the data access request type. The rate-adjustment management component 360 may determine whether the data access allocation includes a remaining allocation for the data access request type, perform the data access request where the data access allocation includes a remaining allocation for the data access request type, and decrement the data access allocation where the data access allocation includes a remaining allocation for the data access request type. In some cases, the data access allocation may be a per-time-period allocation, such as being associated with a twenty-four hour (one day) cycle. The data access allocation may comprise a number of times per time period that the user account is authorized to access a type of media using rate-adjusted access to the network service 170 via the data network.

In some cases, the user request 310 may be a request for retrieval of a page, such as a web page or news feed, the page referencing one or more media items. The rate-adjustment management component 360 may determine a media quality for the one or more media items according to the rate-adjustment wallet 375 and configure the network access component 340 to transmit the one or more media items to the client device 120 at the determined media quality based on the determining according to the rate-adjustment wallet 375.

A page may empower the user to select to receive the one or more media items at a second media quality using a data access allocation for the rate-adjustment wallet 375, the second media quality of a higher quality than the determined media quality. The network access component 340 may receive a high-quality media item request from the client device 120, the high-quality media item request for a particular media item of the one or more media items, and transmit the media item to the client device 120 at the second media quality in response to receiving the high-quality media item request. The rate-adjustment management component 360 may decrement the data access allocation for the rate-adjustment wallet 375 in response to the network access component 340 transmitting the media item to the client device 120 at the second media quality.

In some cases, rate-adjustment policies may only allow rate-adjusted access that excludes some or all images from a page, so as to reduce the bandwidth used in rate-adjusted access and thereby reduce the cost to the data network provider in providing rate-adjusted access. The user request 310 may be for retrieval of a page, the page referencing one or more image items. The rate-adjustment management component 360 may determine that the rate-adjustment wallet 375 indicates that the user account is only authorized to receive rate-adjusted access to the network service 170 via the data network where the rate-adjusted access is image-free and configure the network access component 360 to transmit the page to the client device 120 excluding the one or more image items, wherein transmitting the page to the client device excluding the one or more image items excludes the one or more image items based on the user account only being authorized to receive rate-adjusted access to the network service 170 via the data network where the rate-adjusted access is image-free.

In some cases, rate-adjustment policies may specify that content, such as pages, retrieved using rate-adjusted access should include promotional material for the data network provider. This may particularly be used where the rate-adjusted access is promotional rather than being received due to a purchased data-access package. Where the user request 310 is for retrieval of a page, the rate-adjustment management component 360 may determine that the rate-adjustment wallet 375 indicates that the page should be displayed with a promotional banner image and configure the network access component 340 to transmit the page to the client device 120 with the promotional banner image, wherein the page transmitted to the client device 120 incorporates the promotional banner image based on the determination that the rate-adjustment wallet 375 indicates that the page should be displayed with the promotional banner image. The configuring of the network access component 340 may specifically configure the network access component 340 to include a promotional banner image that would not be included were the page retrieved using non-rate-adjusted access, such as to a non-rate-adjusted server 160.

Figure 4:
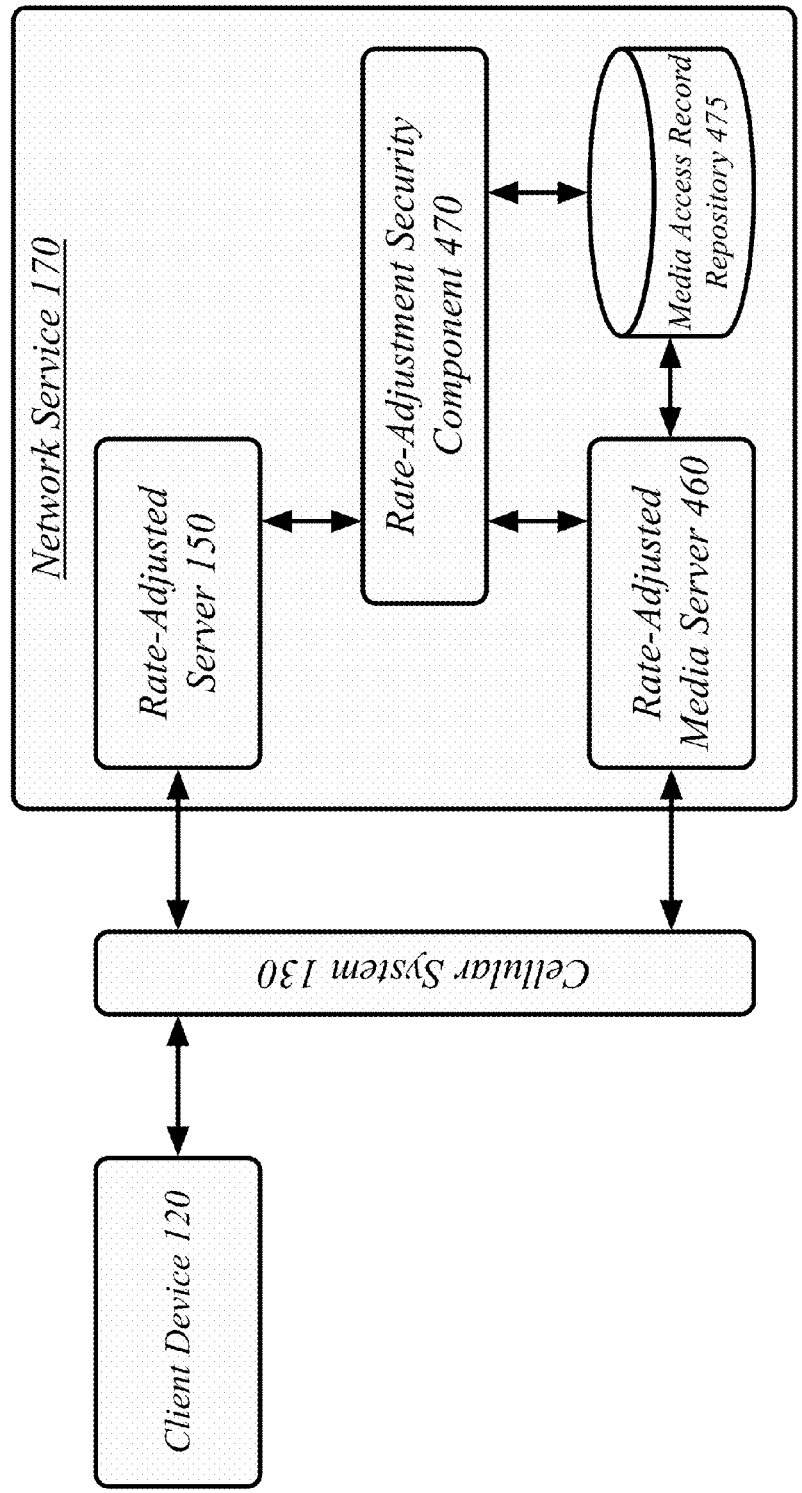
FIG. 4 illustrates an embodiment of a network service including a distinct rate-adjusted image server.

FIG. 4 illustrates an embodiment of a network service 170 including a distinct rate-adjusted image server 460.

The network service 170 may run distinct media servers from the servers used to host other content and perform other operations. Media hosting may benefit from different technical hardware and software configurations to achieve desired performance and therefore be performed by distinct software programs and/or hardware devices. As such, a user request for media content (e.g., images, videos, audio) may be handled by a different server than a user request for non-media content. In some embodiments media-type specific servers may be used, such as image-specific servers.

A request for a page that includes references media content may therefore prompt a client device to retrieve the referenced media content from a media server. The network service 170 may therefore attempt to enforce limits on media quality by referencing in a page a version of a media item that satisfies the restrictions of rate-adjustment policies for a user. However, an inappropriately-configured client device may attempt to bypass the restrictions of rate-adjustment policies by converting references (e.g., URLs) for low-quality media items to references for high-quality media items and thereby requesting the high-quality media items from media servers. A variety of techniques may be used to prevent or otherwise deter the unauthorized retrieval of high-quality media items or other media item requests that would avoid the restrictions of rate-adjustment policies. Such a restriction may correspond either to a total restriction on media items of a particular quality or simply a restriction that provides a limited allocation of rate-adjusted access.

In some embodiments, locators for resources, including locators for media items, may be logically attached to a particular user account. Specifically, a URL referencing a resource may be made specific to a particular user account. The URL may be made specific to the user account based on a cryptographic signing of at least a portion of the URL. A rate-adjusted media server 460 may be rate-adjusted with a data network according to the same techniques as discussed with reference to the rate-adjusted server 150 and may have non-rate-adjusted media server counterparts as with the rate-adjusted server 150. The rate-adjusted media server 460 may receive a user request comprising a URL, the URL specific to the user account based on a cryptographic signing of at least a portion of the URL. The URL may further or alternatively be specific to the user account based on the uniform resource locator containing a user identifier for the user account. The rate-adjusted media server 460 may receive the user-specific URL, access a rate-adjustment wallet 375 for the user account based on the identification of the user account in the URL, and respond to the user request based on the rate-adjustment wallet 375.

In some embodiments, it may be inefficient to burden the rate-adjusted media server 460 with retrieving and evaluating a rate-adjustment wallet 375. It may be inefficient, impractical, or otherwise undesirable to task a rate-adjusted media server 460 with enforcing the rate-adjustment policies and allocations of a rate-adjustment wallet 375 while still maintaining the speed, responsiveness, and availability desired of a media server. This may particularly be the case where rate-adjusted media servers form a distributed content distribution network (CDN) with significant geographic separation. Due to the high-bandwidth usage of media distribution, media servers may be distributed across a geographically broad area to bring the media servers closer to users in their data network. Where a front-end server such as a rate-adjusted server 150 may be able to retrieve rate-adjustment wallet information with low amounts of latency, distributed media servers may require significantly more latency to reach back to the less-distributed data center(s) hosting the rate-adjusted wallets. As such, in these embodiments the rate-adjusted media server 460 may not enforce rate-adjustment policies and allocations and instead rely on a rate-adjustment security component 470 to retroactively catch unauthorized behavior (i.e., the violation of rate-adjustment policies and allocations) and punish or otherwise restrict the guilty user account. The rate-adjusted media servers may each log access to their hosted media content and periodically or intermittently upload these logs for analysis by a rate-adjustment security component 470.

A rate-adjusted media server 460 may receive a user media request from the client device 120 via the data network, the rate-adjusted media server 460 rate-adjusted with the data network. The rate-adjusted media server 460 may transmit a media item to the client device 120 in response to the user media request and store a user media request log entry corresponding to the user media request in a user media request record. The user media request record may be stored with a plurality of user media request records in a media access record repository 475, the media access record repository 475 periodically, continuously, or intermittently analyzed by a rate-adjustment security component 470 to determine if rate-adjustment policies and/or allocations have been violated by client devices. The user media request record may identify the user based on identifying information for the user included with the request, such as a user-account-specific URL or a header for the network transmission of the user media request. The rate-adjustment security component 470 may determine based on the user media request record that the user media request to the rate-adjusted media server 460 defied a data access allocation for the user account in the rate-adjustment wallet 375. The rate-adjustment security component 470 may therefore ban the user account from receiving rate-adjusted access to the network service 170 in response to determining that the user media request defied the data access allocation for the user account in the rate-adjustment wallet 375. This may then prevent the user account, and therefore its associated client device 120, from using rate-adjusted server 150 in the future and thereby prevent the user from receiving rate-adjusted access to the network service 170.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a user request at a network service from a client device via a data network, wherein the network service is rate-adjusted for the client device with the data network at block 502.

The logic flow 500 may determine a user account for the user request at block 504.

The logic flow 500 may access a rate-adjustment wallet for the user account at block 506.

The logic flow 500 may respond to the user request based on the rate-adjustment wallet at block 508.

The embodiments are not limited to this example.

Figure 6:
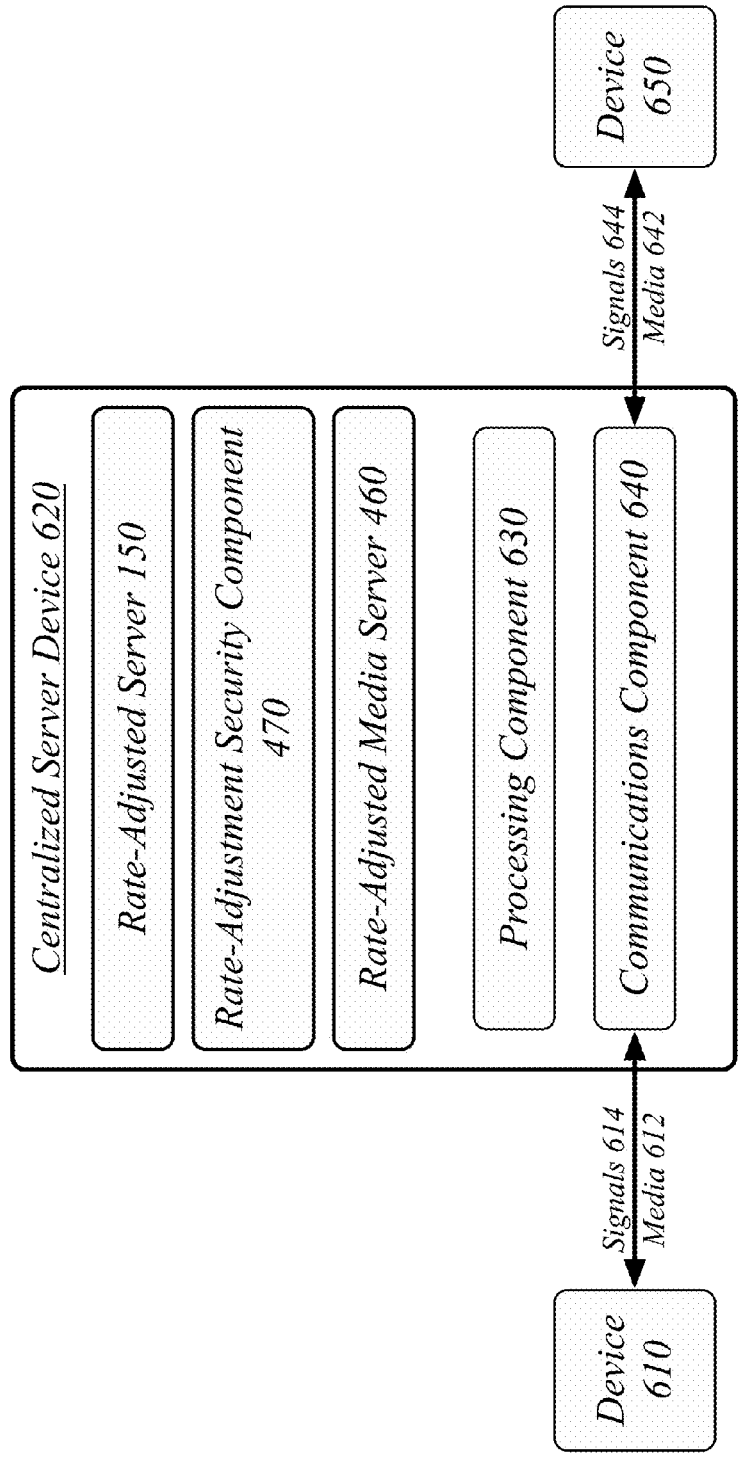
FIG. 6 illustrates an embodiment of a centralized system for the system of FIG. 1.

FIG. 6 illustrates a block diagram of a centralized system 600. The centralized system 600 may implement some or all of the structure and/or operations for the dynamic zero-rating system 100 in a single computing entity, such as entirely within a centralized server device 620.

The centralized server device 620 may comprise any electronic device capable of receiving, processing, and sending information for the dynamic zero-rating system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the dynamic zero-rating system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the dynamic zero-rating system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may implement the rate-adjusted server 150, rate-adjusted media server 460, and rate-adjustment security component 470 in a single computing device. The centralized server device 620 may communicate with other devices 610, 650 over a communications media 612, 642, respectively, using communications signals 614, 644, respectively, via the communications component 640. The devices 610, 650 may be internal or external to the centralized server device 620 as desired for a given implementation. The device 610, 650 may correspond to one or more of client devices (such as client device 120), data network provider devices, or other devices working as part of or in coordination with the network service 170.

Figure 7:
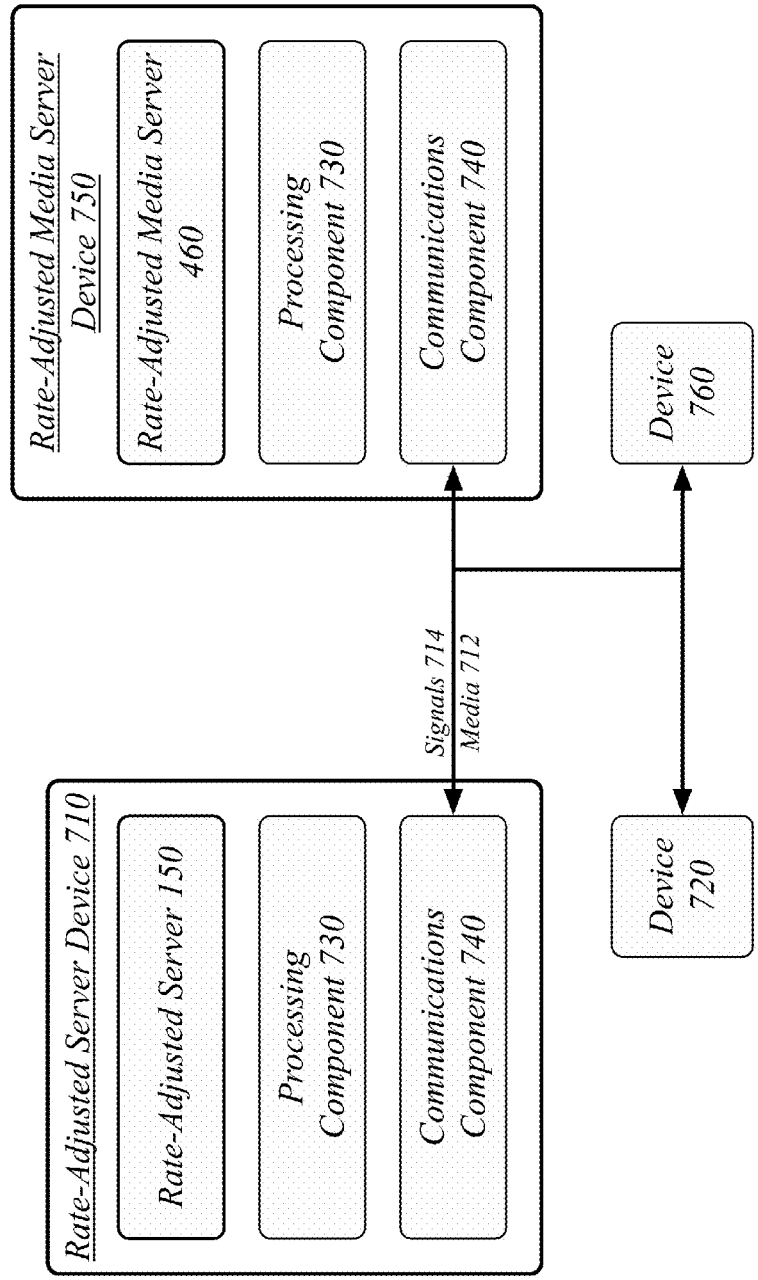
FIG. 7 illustrates an embodiment of a distributed system for the system of FIG. 1.

FIG. 7 illustrates a block diagram of a distributed system 700. The distributed system 700 may distribute portions of the structure and/or operations for the dynamic zero-rating system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a rate-adjusted server device 710 and a rate-adjusted media server device 750. In general, the rate-adjusted server device 710 and the rate-adjusted media server device 750 may be the same or similar to the centralized server device 620 as described with reference to FIG. 6. For instance, the rate-adjusted server device 710 and the rate-adjusted media server device 750 may each comprise a processing component 730 and a communications component 740 which are the same or similar to the processing component 630 and the communications component 640, respectively, as described with reference to FIG. 6. In another example, the devices 710, 750 may communicate over a communications media 712 using communications signals 714 via the communications components 740.

The rate-adjusted server device 710 may comprise or employ one or more client programs that operate to perform various methodologies in accordance with the described embodiments. In one embodiment, for example, the rate-adjusted server device 710 may implement the rate-adjusted server 150.

The rate-adjusted media server device 750 may comprise or employ one or more server programs that operate to perform various methodologies in accordance with the described embodiments. In one embodiment, for example, the rate-adjusted media server device 750 may implement the rate-adjusted media server 460.

In some embodiments, the rate-adjusted server device 710 may also implement the rate-adjustment security component 470. In other embodiments, the rate-adjustment security component 470 may be implemented by a distinct server device.

The device 720, 760 may correspond to one or more of client devices (such as client device 120), data network provider devices, or other devices working as part of or in coordination with the network service 170.

Figure 8:
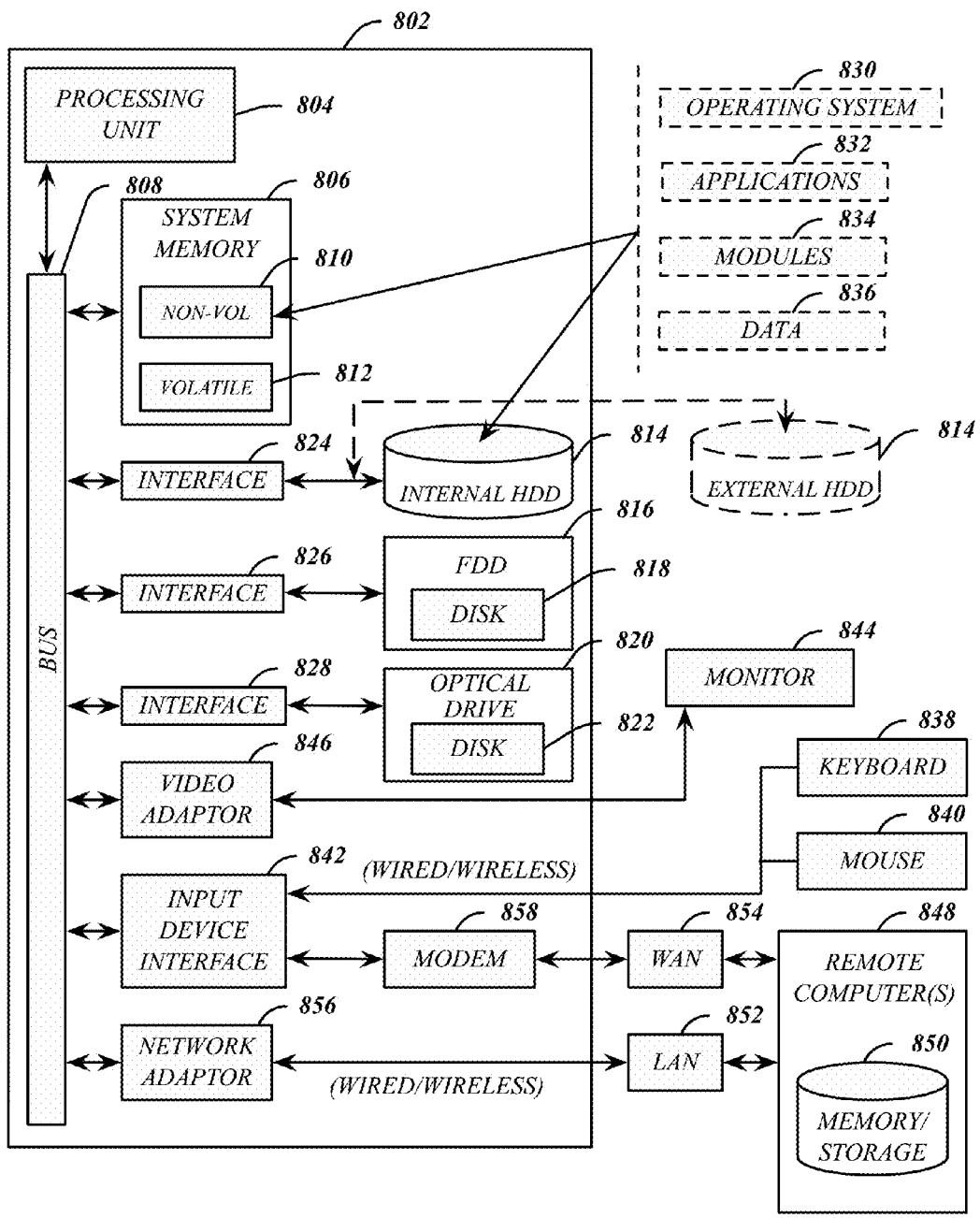
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the dynamic zero-rating system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
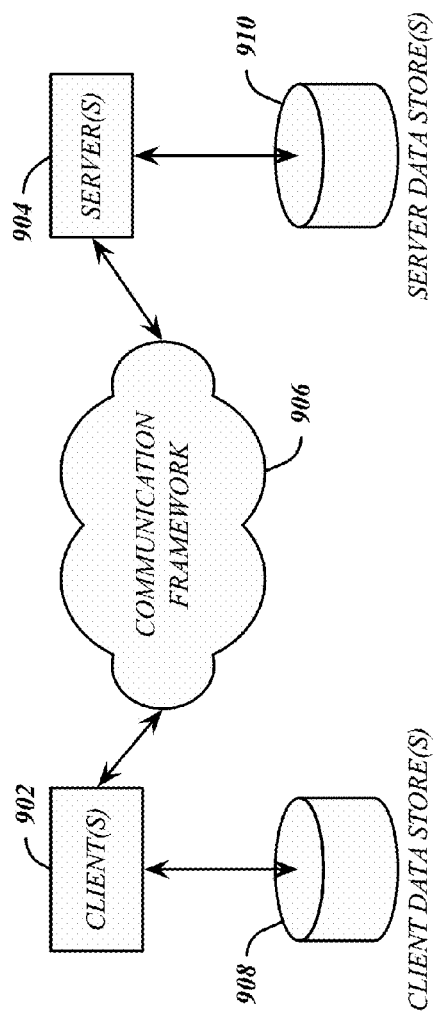
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 910. The servers 904 may implement the server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
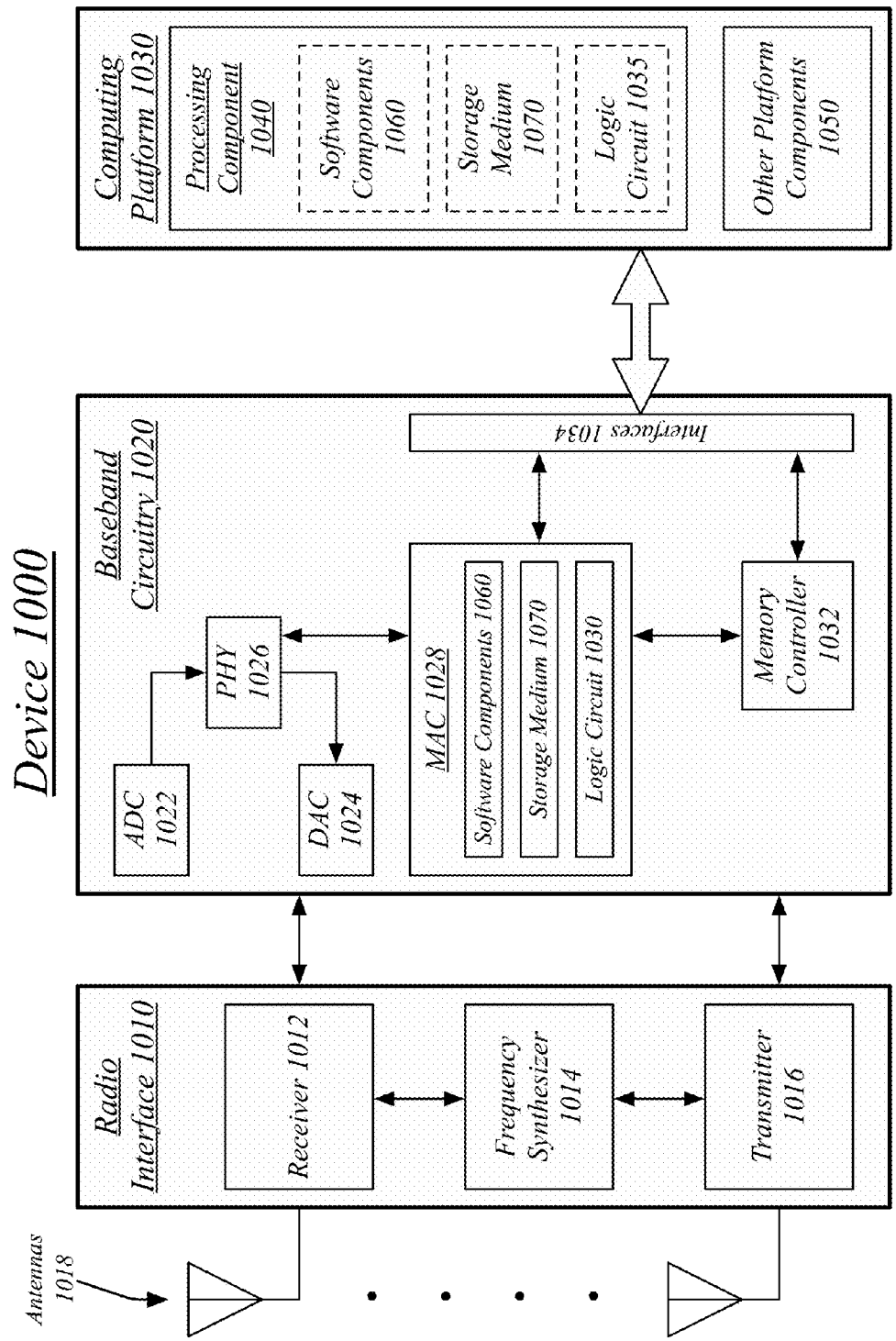
FIG. 10 illustrates an embodiment of a radio device architecture.

FIG. 10 illustrates an embodiment of a device 1000 for use in a multicarrier OFDM system, such as the dynamic zero-rating system 100. Device 1000 may implement, for example, software components 1060 as described with reference to dynamic zero-rating system 100 and/or a logic circuit 1035. The logic circuit 1035 may include physical circuits to perform operations described for the dynamic zero-rating system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the dynamic zero-rating system 100 and/or logic circuit 1035 in a single computing entity, such as entirely within a single device. Alternatively, the device 1000 may distribute portions of the structure and/or operations for the dynamic zero-rating system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the dynamic zero-rating system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a user request at a network service from a client device via a data network, wherein the network service is rate-adjusted for the client device with the data network; determining a user account for the user request; accessing a rate-adjustment wallet for the user account; and responding to the user request based on the rate-adjustment wallet.

A computer-implemented method may further comprise wherein the network service being rate-adjusted for the client device comprises the network service being zero-rated for the client device with the data network.

A computer-implemented method may further comprise determining based on a rate-adjustment allocation stored in the rate-adjustment wallet whether the user account is authorized to perform the user request using rate-adjusted access to the network service.

A computer-implemented method may further comprise determining based on a rate-adjustment allocation stored in the rate-adjustment wallet that the user account is authorized to perform the user request using rate-adjusted access to the network service; and performing the user request in response to determining that the user account is authorized to perform the user request using rate-adjusted access to the network service.

A computer-implemented method may further comprise determining based on a rate-adjustment allocation stored in the rate-adjustment wallet that the user account is not authorized to perform the user request using rate-adjusted access to the network service; and transmitting a user request rejection to the client device in response to determining that the user account is not authorized to perform the user request using rate-adjusted access to the network service.

A computer-implemented method may further comprise the rate-adjustment wallet defined according to a data access product associated with a data network provider for the data network.

A computer-implemented method may further comprise the network service rate-adjusted with a plurality of data networks including the data network via which the user request is received, wherein the rate-adjustment wallet for the user account is specific to the data network via which the user request is received.

A computer-implemented method may further comprise determining a data network provider for the data network via which the user request is received according to a provider header of a received network transmission of the user request; and determining the rate-adjustment wallet to access based on the user account and the determined data network provider.

A computer-implemented method may further comprise the user request comprising at least a data access request, the data access request corresponding to a data access request type, the rate-adjustment wallet defining a data access allocation for the data access request type, further comprising: determining whether the data access allocation includes a remaining allocation for the data access request type; performing the data access request where the data access allocation includes a remaining allocation for the data access request type; and decrementing the data access allocation where the data access allocation includes a remaining allocation for the data access request type.

A computer-implemented method may further comprise wherein the data access allocation is a per-time-period allocation.

A computer-implemented method may further comprise the data access allocation comprising a number of times per time period that the user account is authorized to access a type of media using rate-adjusted access to the network service via the data network.

A computer-implemented method may further comprise the type of media comprising one of an image media type, a video media type, or an audio media type.

A computer-implemented method may further comprise the user request for retrieval of a page, the page referencing one or more media items, further comprising: determining a media quality for the one or more media items according to the rate-adjustment wallet; and transmitting the one or more media items to the client device at the determined media quality based on the determining according to the rate-adjustment wallet.

A computer-implemented method may further comprise the page empowering the user to select to receive the one or more media items at a second media quality using a data access allocation for the rate-adjustment wallet, the second media quality of a higher quality than the determined media quality, further comprising: receiving a high-quality media item request from the client device, the high-quality media item request for a particular media item of the one or more media items; transmitting the media item to the client device at the second media quality in response to receiving the high-quality media item request; and decrementing the data access allocation for the rate-adjustment wallet in response to transmitting the media item to the client device at the second media quality.

A computer-implemented method may further comprise the user request for retrieval of a page, the page referencing one or more image items, further comprising: determining that the rate-adjustment wallet indicates that the user account is only authorized to receive rate-adjusted access to the network service where the rate-adjusted access is image-free; and transmitting the page to the client device excluding the one or more image items, wherein transmitting the page to the client device excludes the one or more image items based on the user account only being authorized to receive rate-adjusted access to the network service via the data network where the rate-adjusted access is image-free.

A computer-implemented method may further comprise the user request for retrieval of a page, further comprising: determining that the rate-adjustment wallet indicates that the page should be displayed with a promotional banner image; and transmitting the page to the client device with the promotional banner image, wherein the page transmitted to the client device incorporates the promotional banner image based on the determination that the rate-adjustment wallet indicates that the page should be displayed with the promotional banner image.

A computer-implemented method may further comprise the user request comprising a uniform resource locator, the uniform resource locator specific to the user account.

A computer-implemented method may further comprise the uniform resource locator specific to the user account based on a cryptographic signing of at least a portion of the uniform resource locator.

A computer-implemented method may further comprise the uniform resource locator specific to the user account based on the uniform resource locator containing a user identifier for the user account.

A computer-implemented method may further comprise receiving a user media request from the client device at a rate-adjusted media server via the data network; transmitting a media item to the client device in response to the user media request; storing a user media request log entry corresponding to the user media request in a user media request record; determining based on the user media request record that the user media request to the rate-adjusted media server defied a data access allocation for the user account in the rate-adjustment wallet; and banning the user account from receiving rate-adjusted access to the network service in response to determining that the user media request defied the data access allocation for the user account in the rate-adjustment wallet.

An apparatus may comprise a processor circuit on a device; a network access component operative on the processor circuit to receive a user request at a network service from a client device via a data network, wherein the network service is rate-adjusted for the client device with the data network; and respond to the user request; and a rate-adjustment management component operative on the processor circuit to access a rate-adjustment wallet for a user account for the user request; and configure the network access component to respond to the user request based on the rate-adjustment wallet. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a user request at a network service from a client device via a data network, the user request comprising a request to access a network resource by the client device;
determining a user account associated with the requesting client device for the user request;
accessing a rate-adjustment wallet for the user account, the rate-adjustment wallet comprising a rate-adjustment policy associated with the client device and variable information relevant to a use of a defined rate-adjustment allocation of the rate-adjustment policy, wherein the rate-adjustment policy defines what interactions between the client device and the network service across the data network are rate-adjusted; and
responding to the user request based on the rate-adjustment wallet.

2. The method of claim 1, wherein the network service being rate-adjusted for the client device comprises the network service being zero-rated for the client device with the data network.

3. The method of claim 1, the network service rate-adjusted with a plurality of data networks including the data network via which the user request is received, wherein the rate-adjustment wallet for the user account is specific to the data network via which the user request is received.

4. The method of claim 1, the user request comprising at least a data access request, the data access request corresponding to a data access request type, the rate-adjustment wallet defining a data access allocation for the data access request type, further comprising:
determining whether the data access allocation includes a remaining allocation for the data access request type;
performing the data access request where the data access allocation includes a remaining allocation for the data access request type; and
decrementing the data access allocation where the data access allocation includes a remaining allocation for the data access request type.

5. The method of claim 1, the user request for retrieval of a page, the page referencing one or more media items, further comprising:
determining a media quality for the one or more media items according to the rate-adjustment wallet; and
transmitting the one or more media items to the client device at the determined media quality based on the determining according to the rate-adjustment wallet.

6. The method of claim 5, the page empowering the user to select to receive the one or more media items at a second media quality using a data access allocation for the rate-adjustment wallet, the second media quality of a higher quality than the determined media quality, further comprising:
receiving a high-quality media item request from the client device, the high-quality media item request for a particular media item of the one or more media items;
transmitting the media item to the client device at the second media quality in response to receiving the high-quality media item request; and
decrementing the data access allocation for the rate-adjustment wallet in response to transmitting the media item to the client device at the second media quality.

7. The method of claim 1, the user request for retrieval of a page, the page referencing one or more image items, further comprising:
determining that the rate-adjustment wallet indicates that the user account is only authorized to receive rate-adjusted access to the network service where the rate-adjusted access is image-free; and
transmitting the page to the client device excluding the one or more image items, wherein transmitting the page to the client device excludes the one or more image items based on the user account only being authorized to receive rate-adjusted access to the network service via the data network where the rate-adjusted access is image-free.

8. The method of claim 1, the user request for retrieval of a page, further comprising:
determining that the rate-adjustment wallet indicates that the page should be displayed with a promotional banner image; and
transmitting the page to the client device with the promotional banner image, wherein the page transmitted to the client device incorporates the promotional banner image based on the determination that the rate-adjustment wallet indicates that the page should be displayed with the promotional banner image.

9. The method of claim 1, further comprising:
receiving a user media request from the client device at a rate-adjusted media server via the data network;
transmitting a media item to the client device in response to the user media request;

storing a user media request log entry corresponding to the user media request in a user media request record;
determining based on the user media request record that the user media request to the rate-adjusted media server defied a data access allocation for the user account in the rate-adjustment wallet; and
banning the user account from receiving rate-adjusted access to the network service in response to determining that the user media request defied the data access allocation for the user account in the rate-adjustment wallet.

10. An apparatus, comprising:
a processor circuit on a device;
a network access component operative on the processor circuit to receive a user request at a network service from a client device via a data network, the user request comprising a request to access a network resource by the client device; and respond to the user request; and
a rate-adjustment management component operative on the processor circuit to access a rate-adjustment wallet for a user account associated with the requesting client device for the user request, the rate-adjustment wallet comprising a rate-adjustment policy associated with the client device and variable information relevant to a use of a defined rate-adjustment allocation of the rate-adjustment policy, wherein the rate-adjustment policy defines what interactions between the client device and the network service across the data network are rate-adjusted; and configure the network access component to respond to the user request based on the rate-adjustment wallet.

11. The apparatus of claim 10, the network service rate-adjusted with a plurality of data networks including the data network via which the user request is received, wherein the rate-adjustment wallet for the user account is specific to the data network via which the user request is received.

12. The apparatus of claim 10, the user request comprising at least a data access request, the data access request corresponding to a data access request type, the rate-adjustment wallet defining a data access allocation for the data access request type, further comprising:
the rate-adjustment management component operative to determine whether the data access allocation includes a remaining allocation for the data access request type, configure the network access component to perform the data access request where the data access allocation includes a remaining allocation for the data access request type, and decrement the data access allocation where the data access allocation includes a remaining allocation for the data access request type.

13. The apparatus of claim 10, the user request for retrieval of a page, the page referencing one or more media items, further comprising:
the rate-adjustment component operative to determine a media quality for the one or more media items according to the rate-adjustment wallet and configure the network access component to transmit the one or more media items to the client device at the determined media quality based on the determining according to the rate-adjustment wallet.

14. The apparatus of claim 13, the page empowering the user to select to receive the one or more media items at a second media quality using a data access allocation for the rate-adjustment wallet, the second media quality of a higher quality than the determined media quality, further comprising:

the network access component operative to receive a high-quality media item request from the client device, the high-quality media item request for a particular media item of the one or more media items and transmit the media item to the client device at the second media quality in response to receiving the high-quality media item request; and
the rate-adjustment management component operative to decrement the data access allocation for the rate-adjustment wallet in response to the network access component transmitting the media item to the client device at the second media quality.

15. The apparatus of claim 10, the user request for retrieval of a page, the page referencing one or more image items, further comprising:
the rate-adjustment management component operative to determine that the rate-adjustment wallet indicates that the user account is only authorized to receive rate-adjusted access to the network service where the rate-adjusted access is image-free; and configure the network access component to transmit the page to the client device excluding the one or more image items, wherein transmitting the page to the client device excludes the one or more image items based on the user account only being authorized to receive rate-adjusted access to the network service via the data network where the rate-adjusted access is image-free.

16. At least one non-transitory computer-readable storage medium comprising instructions that, when executed, cause a system to:
receive a user request at a network service from a client device via a data network, the user request comprising a request to access a network resource by the client device;
determine a user account associated with the requesting client device for the user request;
access a rate-adjustment wallet for the user account, the rate-adjustment wallet comprising a rate-adjustment policy associated with the client device and variable information relevant to a use of a defined rate-adjustment allocation of the rate-adjustment policy, wherein the rate-adjustment policy defines what interactions between the client device and the network service across the data network are rate-adjusted; and
respond to the user request based on the rate-adjustment wallet.

17. The computer-readable storage medium of claim 16, the user request comprising at least a data access request, the data access request corresponding to a data access request type, the rate-adjustment wallet defining a data access allocation for the data access request type, comprising further instructions that, when executed, cause a system to:
determine whether the data access allocation includes a remaining allocation for the data access request type;
perform the data access request where the data access allocation includes a remaining allocation for the data access request type; and
decrement the data access allocation where the data access allocation includes a remaining allocation for the data access request type.

18. The computer-readable storage medium of claim 16, the user request for retrieval of a page, the page referencing one or more media items, comprising further instructions that, when executed, cause a system to:
determine a media quality for the one or more media items according to the rate-adjustment wallet; and transmit the one or more media items to the client device at the determined media quality based on the determining according to the rate-adjustment wallet.

19. The computer-readable storage medium of claim 18, the page empowering the user to select to receive the one or more media items at a second media quality using a data access allocation for the rate-adjustment wallet, the second media quality of a higher quality than the determined media quality, comprising further instructions that, when executed, cause a system to:
- receive a high-quality media item request from the client device, the high-quality media item request for a particular media item of the one or more media items;
- transmit the media item to the client device at the second media quality in response to receiving the high-quality media item request; and
- decrement the data access allocation for the rate-adjustment wallet in response to transmitting the media item to the client device at the second media quality.

20. The computer-readable storage medium of claim 16, the user request for retrieval of a page, the page referencing one or more image items, comprising further instructions that, when executed, cause a system to:
- determine that the rate-adjustment wallet indicates that the user account is only authorized to receive rate-adjusted access to the network service where the rate-adjusted access is image-free; and
- transmit the page to the client device excluding the one or more image items, wherein transmitting the page to the client device excludes the one or more image items based on the user account only being authorized to receive rate-adjusted access to the network service via the data network where the rate-adjusted access is image-free.

\* \* \* \* \*